Aug. 21, 1962   S. G. CARFAGNO   3,049,889
METHOD AND APPARATUS FOR RENDERING BRINE SOLUTION POTABLE
Filed Jan. 2, 1958

Section A-A

INVENTOR.
SALVATORE G. CARFAGNO
BY *Herman Seid*
ATTORNEY

United States Patent Office 3,049,889
Patented Aug. 21, 1962

3,049,889
METHOD AND APPARATUS FOR RENDERING BRINE SOLUTION POTABLE
Salvatore G. Carfagno, Fayetteville, N.Y., assignor to Carrier Corporation, Syracuse, N.Y., a corporation of Delaware
Filed Jan. 2, 1958, Ser. No. 706,629
3 Claims. (Cl. 62—58)

This invention relates to a method and apparatus for rendering brine solution potable, and more particularly, to a method and apparatus for converting sea water to potable water.

Generally, systems employing distillaiton have been favored for the production of potable water from sea water. At the present time the basic reason for using such systems is their lower cost per quantity of water produced. It has been long known that sea water may be purified by freezing. Theoretically this method is more attractive than distillation, since the energy required to freeze water may be one-fifth of the amount required in many cases in distillation processes.

Despite this theoretic advantage, in practice systems which utilize freezing either demand extravagant amounts of energy or else purify water inadequately. These difficulties stem mainly from the fact brine not only clings to the surface of the ice formed but also remains in the interstices between the ice crystals. When centrifugal separation systems are used it has been found that the great centrifugal forces utilized are not sufficient to overcome the tenacity with which the brine clings to the finely divided ice. With respect to washing systems, it has been found in many cases that excessive amounts of potable water are required to wash this brine from the ice, resulting in systems having extremely low yields.

The chief object of the present invention is to provide a method and apparatus for rendering a brine solution potable, utilizing a freezing operation wherein the brine is removed from the ice crystals at extremely low cost.

An object of the present invention is to provide an apparatus and method for converting a brine solution, such as sea water, to potable water combining gravity separation, centrifugal separation and washing.

A still further object is to provide an improved method for forming potable water from a brine solution, such as sea water, in which the brine is centrifugally drained from an ice and brine mixture while washing fluid is applied to the remaining ice to remove the brine from the interstices thereof. Other objects of the invention will be more readily perceived from the following description.

This invention relates to a method of rendering brine solutions potable in which the steps consist in forming ice in a brine solution, separating the ice from the brine solution, centrifugally draining the brine from the ice so separated and washing the brine from the surface and interstices of the ice.

This invention further relates to an apparatus for rendering brine solution potable which comprises means for forming ice in a brine solution, means for separating the ice from the brine, means for centrifugally draining the brine from the ice and means for washing the brine from the surface and interstices of the ice.

The attached drawings illustrate a preferred embodiment of the invention in which.

Figure 1:
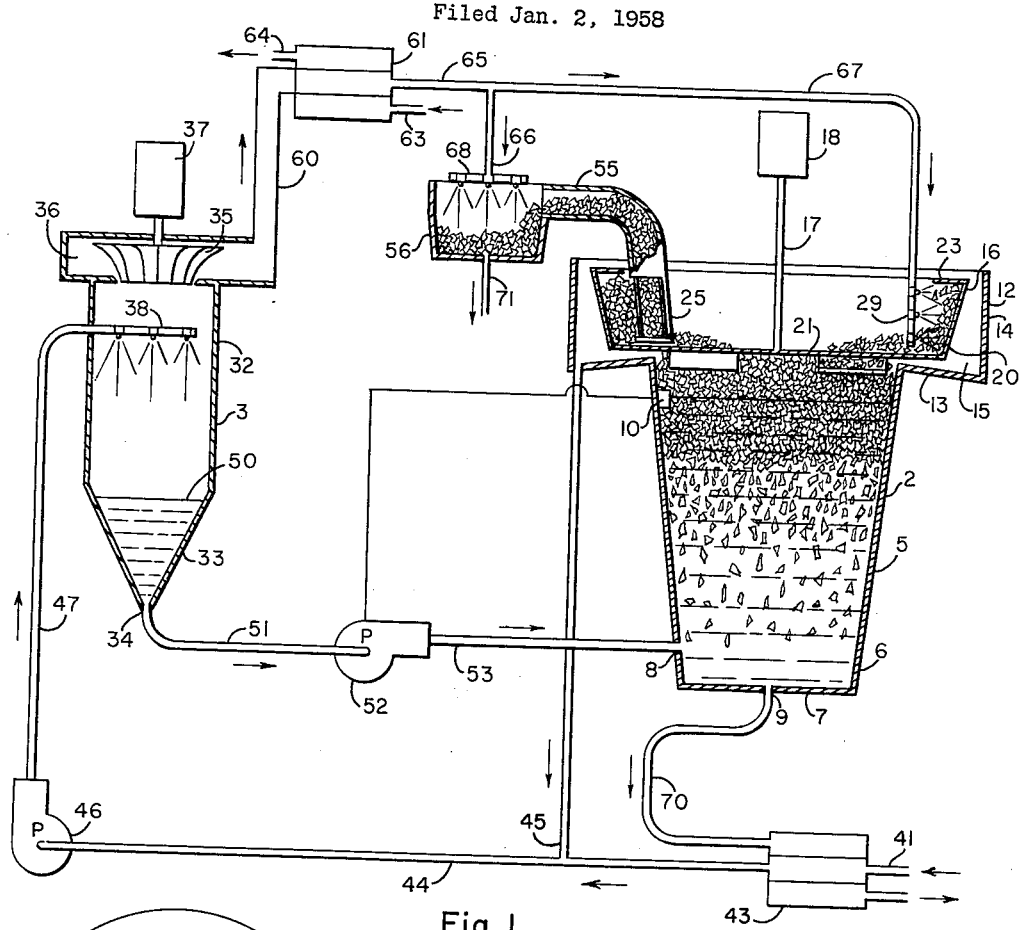
FIGURE 1 is a partly diagrammatic and partly sectional view of a system employing the apparatus comprising the invention.

Referring to the drawings, there is shown in FIGURE 1 a partially diagrammatic and partially sectional view of the system and apparatus comprising the present invention. Basically the system comprises a separating apparatus 2 which receives an ice and brine mixture from a freezing apparatus 3 for the purpose of separating the ice from th brine, draining the brine from the ice and then washing the brine from the surface and interstices of the ice crystals.

The settling tank or separating apparatus 2 comprises a separating section 5 which includes a frusto-conical wall section 6 and a bottom 7. In the wall 6 there is located a brine and ice mixture inlet 8 and in the bottom there is located a concentrated brine discharge 9. Located in the upper portion of this conical section 6 is a suitable level sensing device 10 which may be of an electrode type, a density type, a salinity indicator type or a simple float switch control, the function of which will be more fully described hereinafter.

Above the separating section 5 there is located the centrifugal separation section 12. This section comprises an annular inclined wall 13 which extends from the end portion of the conical wall 6 and with the cylindrical side wall 14 defines an annular trough 15.

A basket 16 is situated above the conical wall section 6 and this basket 16 is attached by means of a suitable shaft 17 to a motor 18 which is adapted to rotate the basket.

Figure 2:
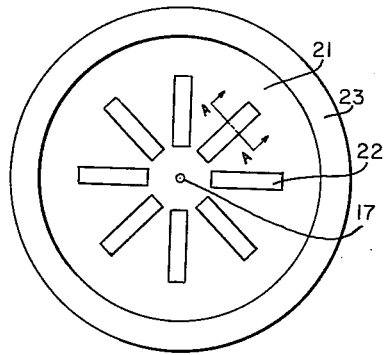
FIGURE 2 is a plan view of the basket used in the apparatus.
Figure 3:
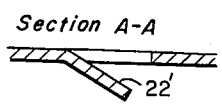
FIGURE 3 is a sectional view of the ice collecting means in the bottom of the basket.

The basket 16 comprises a conical side wall 20 which has located therein suitable perforations of a size sufficient to contain the ice crystals when the basket is subjected to centrifugal action. The basket also has a bottom section 21 more clearly seen in FIGURE 2. This bottom portion 21 has suitable radially extended slotted openings 22 which have downwardly extending blades 22'. The upper portion of the basket has a suitable annular lip 23 which extends inwardly.

Figures 4, 5:
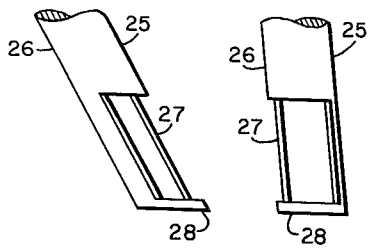
FIGURE 4 is a side view of the scope which removed the ice from the basket.
FIGURE 5 is a front view of the scoop.

A suitable scoop 25 is provided for the purpose of removing the washed ice from the basket 16. This scoop is indicated in FIGURES 4 and 5. FIGURE 4 shows the scoop looking in a direction toward the center of the basket. This scoop comprises a pipe section 26 which has a suitable cutout portion and an arcuate section 27 which terminates in a suitable toe section 28. Referring to FIGURE 5 there is shown a front view of the scoop with the portions 25 and 28 suitably indicated.

Ice and brine solution are supplied to the separating apparatus from a suitable freezer 3. This freezing apparatus comprises a cylindrical section 32 which is located above a conical section 33 which terminates in a suitable discharge opening 34. Located above the cylindrical section 32 is a suitable centrifugal compressor 35 which discharges into an annular space 36. The compressor 35 is driven by a motor 37. Below the centrifugal compressor 35 and enveloped by the cylindrical sections 32 of the freezer is a suitable spray nozzle header 38, the purpose of which will be described more fully hereinafter.

Sea water or any other source of impure or brackish water is introduced into the system through a line 41. This water passes through a suitable heat exchanger 43 within the temperature of the brine is decreased by being into heat exchange relation with concentrated brine discharged by the system. This chilled brine is then passed through the supply line 44 to a pump 46. To supplement and make the system more efficient, low temperature wash water which contains some brine is introduced from the separating apparatus through the line 45 into the line 44. The pump 46 then discharges this brine solution through the line 47 into the spray header 38.

Ice and brine solution are discharged from the freezer 3 through the discharge opening 34 through the line 51 into the pump 52. This pump 52 is controlled by the level sensing device 10 which maintains the level within the separating apparatus 2. The pump 52 discharges through the line 53 through the opening 8 into the separating section of the apparatus 2. Concentrated brine is passed from the apparatus 2 through the opening 9 through the line 70 into the heat exchanger 43.

The annular manifold 36 of the centrifugal compressor 35 discharges into a line 60 which is connected to the heat exchanger 61 through which a suitable cooling medium is passed. The vapor discharged by the compressor is then suitably condensed and the condensed liquid is passed through the line 65 and into the lines 67 and 66. The line 66 being connected to a spray header 68 which introduces water into a vessel 56 wherein ice is collected, the purpose of which is to melt the ice so that it may be discharged through the opening 71, for use. Ice is introduced into this vessel 56 by means of the line 55 which is connected to the scoop 25. In some instances it may be necessary that a suitable screw conveyor be utilized in this line for the purpose of transporting the ice from the scoop 25 into the vessel 56.

Water which passes through the line 67 is introduced into the spray header 29 which passes the water onto the ice in the basket 16 in a manner to be described more fully hereinafter.

Considering the operation of the system, sea water is introduced through the line 41 and passes into heat exchanger 43. In this heat exchanger the concentrated brine which passes through the line 70 is placed in heat exchange relation with this sea water. The temperature of the sea water or brine is suitably lowered and then introduced into the line 44 where the brine is mixed with contaminated wash water which was previously used to wash brine from the ice in basket 16. The line 44 is connected to the pump 46 which passes the brine through the line 47 to the spray header 38 in the freezing apparatus 3.

This freezing compartment is maintained by the centrifugal compressor 35 at a vacuum of, for example, 3.4 millimeters of mercury which corresponds to a temperature of 25.5° F. The concentration of salt in the brine solution under such circumstances is approximately 6%. A mixture of ice and brine solution is formed in the conical section 33 of the freezer at a level of approximately as shown at 50. This ice and brine is then discharged through the opening 34 and into the line 51 and then pumped by the pump 52 through the line 53 in response to the demands of a level indicator 10 which controls the pump 52.

This ice and brine solution passes through the inlet 8 into the separating section of the separating apparatus 2. In this section of the apparatus a natural gravity separation takes place wherein the concentration of brine is very high at the bottom of the vessel and the ice, because of its lesser density passes upwardly in the vessel. Simultaneously there occurs a diminishment of brine concentration because of lesser density as the level 10' is approached in the vessel. The concentrated brine is continually discharged through the opening 9 through the line 70 and out of the system.

The ice collects above the level 10' and passes upwardly and comes into contact with the rotating blades 22' of the basket 16. This ice is then passed upwardly into the basket 16 and pushed outwardly against the perforated conical surface 20. The rotation of the basket 16 as a result of centrifugal force hastens the gradual draining effect which was taking place immediately above the level 10' within the section 5 of the separating apparatus 2. Simultaneously as the brine is drained from this ice which has been scooped from the lower portion of this apparatus, potable water from the line 67 is passed through the spray header 29 and sprayed outwardly onto the ice packed along the annular perforated surface 20. This water is an extremely small amount because the separation in the separating section 5 and the centrifugal drainage has removed most of the brine requiring only a small washing action to make pure ice. This liquid passes outwardly washing the ice. The brine previously held by the ice and which was removed by centrifugal force and the contaminated washing fluid is collected in the annular trough 15 which is connected to the line 45. This mixture of brine and wash water is then passed, as previously mentioned, into the line 44.

The rotation of the basket 16 causes the ice to move upwardly along the surface of the perforated wall 20 until the lip 23 is encounted. At this point the ice is turned inwardly and abuts against the scoop 25 which because of its lower toe 28 and back wall 27 collects the ice. The rotation of the basket creates a sufficient force to move the ice up the pipe 55 into the vessel 56.

The centrifugal compressor 35 discharges into the annular space 36. The pressure at this discharge side of the compressor normally depends upon the compressor used; however, in this application a vacuum of approximately 5.6 millimeters of mercury is expected. This vapor is then passed through the line 60 into the heat exchanger 61. Suitable cooling medium from a suitable cooling tower or refrigeration system is passed through the line 63 into heat exchange with the vapor in line 60. This coolant is discharged through the line 64. The condensed vapor is then discharged into the line 65. A portion of this liquid is directed through the line 67 passing to the washing header 29. The remainder of the water is utilized for melting purposes. This water passes through the line 66 to the spray header 68 which discharges the water on top of the ice collected in the vessel 56. This melted ice is then discharged for use through the line 71.

The present invention is directed to a method and appartus which utilizes gravity separation combined with centrifugal drainage of the brine from the ice mass separated and utilizes a washing fluid to remove the ice which adheres to the surface of the ice and is entrapped within the ice crystals.

While I have described a preferred embodiment of the invention, it will be understood the invention is not limited thereto since it may be otherwise embodied within the scope of the following claims.

I claim:

1. In a method of rendering a brine solution potable the steps of passing a brine solution to a freezer vessel, evacuating the freezer vessel to a pressure which causes flash freezing of the brine solution thereby producing a mixture of ice and brine in the freezer vessel, gravitationally partially separating the ice from the mixture, passing the partially separated ice to a centrifugal separator and washer, condensing relatively pure water from water vapor removed from the freezer vessel upon evacuation thereof, passing at least a portion of the condensed water vapor over the ice in the centrifugal separator while simultaneously rotating the centrifugal separator to wash and separate the ice therein from brine remaining on the surface and in the interstices of the ice, collecting the washed and separated ice and melting the collected ice to produce potable water.

2. In a system for rendering a brine solution potable, the combination of a freezer vessel, means to remove water vapor from said freezer vessel and to maintain a vacuum therein, means for introducing a brine solution into said freezer vessel, said means to remove water vapor being adapted to reduce the pressure in said freezer vessel to a point sufficiently low to cause flash freezing of said brine solution thereby forming an ice and brine mixture, a settling apparatus comprising a settling tank for partially separating ice from said ice and brine mixture, means for passing the ice and brine mixture formed in said freezer vessel to said settling apparatus, centrifugal separation means comprising a perforated basket mounted for rotation, means to rotate said basket, means for passing partially separated ice from said settling tank to said basket, means to condense water vapor removed from said freezer vessel, means to distribute water condensed from vapor removed from said freezer vessel over said partially separated ice in said basket while rotating said basket to remove brine from the surface and interstices of said partially separated ice in said basket and means to melt the separated ice to form potable water.

3. In an apparatus of the type described, a separation tank, means for providing an ice and brine solution in said separation tank, and a centrifugal separator positioned above said separation tank, said centrifugal separator comprising a rotatable perforated basket having an apertured bottom portion, a downwardly extending blade member secured to said basket and depending from an adjacent aperture in said bottom portion of the basket, said basket being adapted for rotation in a predetermined direction, said blade member being located adjacent the rearward edge of the apertured bottom portion of said centrifugal separator and being adapted to scoop ice from the surface of said separation tank and pass it through said adjacent aperture into the basket of said centrifugal separator upon rotation of said basket, and means for melting the separated ice comprising a melting vessel and means to transfer separated ice from said basket to said melting vessel, said last named means comprising a stationary scoop member extending from said melting vessel into said basket, said scoop member being tubular in form and having an open end positioned in said basket to receive ice separated from said brine by said centrifugal separator, said scoop member being adapted to pass ice received in the open end thereof through the tubular member into the melting vessel due to the pressure of ice forced into said open end by rotation of the basket of the centrifugal separator.

References Cited in the file of this patent

UNITED STATES PATENTS

| | | |
|---|---|---|
| 1,865,614 | Caldwell | July 5, 1932 |
| 1,931,347 | Gay | Oct. 17, 1933 |
| 2,315,762 | Ax et al. | Apr. 6, 1943 |
| 2,354,633 | Bedford | July 25, 1944 |
| 2,419,881 | Borgerd | Apr. 29, 1947 |
| 2,448,802 | Holzcker | Sept. 7, 1948 |
| 2,590,499 | Braswell | Mar. 25, 1952 |
| 2,676,469 | Wenzelberger | Apr. 27, 1954 |
| 2,734,355 | Wenzelberger | Feb. 14, 1956 |
| 2,764,488 | Slattery | Sept. 25, 1956 |
| 2,821,304 | Zarchin | Jan. 28, 1958 |

OTHER REFERENCES

Processes for Desalting Water by Freezing, by Harold M. Hendrickson et al., pages 102–112, August 1956.